(12) United States Patent
Hjelm et al.

(10) Patent No.: US 11,008,960 B2
(45) Date of Patent: May 18, 2021

(54) ACTIVE COMBUSTION AIR INTAKE SYSTEM FOR TRUCK, TRACTOR, OR BUS VEHICLE

(71) Applicant: Volvo Truck Corporation, Gothenburg (SE)

(72) Inventors: Linus Hjelm, Gothenburg (SE); Rodrigo Caus Martins, Curitiba (BR); Fabio Ribeiro, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 332 days.

(21) Appl. No.: 15/780,803

(22) PCT Filed: Dec. 11, 2015

(86) PCT No.: PCT/BR2015/000185
§ 371 (c)(1),
(2) Date: Jun. 1, 2018

(87) PCT Pub. No.: WO2017/096441
PCT Pub. Date: Jun. 15, 2017

(65) Prior Publication Data
US 2020/0049082 A1 Feb. 13, 2020

(51) Int. Cl.
*F02D 41/00* (2006.01)
*B60K 13/02* (2006.01)
(Continued)

(52) U.S. Cl.
CPC .......... *F02D 41/0002* (2013.01); *B60K 13/02* (2013.01); *F02D 9/02* (2013.01);
(Continued)

(58) Field of Classification Search
CPC ........ F02D 41/0002; F02D 41/18; F02D 9/00; F02D 9/02; F02D 2200/0404;
(Continued)

(56) References Cited

U.S. PATENT DOCUMENTS 1,855,038 A * 4/1932 Walker ............ F02M 35/10013
180/68.3
4,212,659 A 7/1980 Magrini
(Continued)

FOREIGN PATENT DOCUMENTS

CN 1704568 A 12/2005
CN 1711413 A 12/2005
(Continued)

OTHER PUBLICATIONS

Examination Report for European Patent Application No. 15909967.0, dated Mar. 31, 2020, 4 pages.
(Continued)

*Primary Examiner* — Jacob M Amick
*Assistant Examiner* — Charles Brauch
(74) *Attorney, Agent, or Firm* — Withrow & Terranova, PLLC

(57) ABSTRACT

A combustion air intake apparatus for a truck, tractor, or bus vehicle for highway use includes an air deflecting element that is selectively deployable to cause dynamic air pressure created by vehicle motion to increase static air, pressure within the intake apparatus under appropriate conditions. Deployment or retraction of the air deflecting element is responsive to at least one of forward speed of the vehicle, air pressure downstream of an air inlet opening, or throttle position, and may further be responsive to detection of precipitation and/or particulate material. An air deflecting element may include a moveable plate or flap, moveable louvers, or a moveable duct.

18 Claims, 12 Drawing Sheets

(51) Int. Cl.
*F02D 9/02* (2006.01)
*F02M 35/10* (2006.01)
*F02M 35/16* (2006.01)

(52) U.S. Cl.
CPC ......... *F02M 35/10013* (2013.01); *F02M 35/10137* (2013.01); *F02M 35/10262* (2013.01); *F02M 35/164* (2013.01); *B60Y 2200/143* (2013.01); *B60Y 2200/221* (2013.01); *F02D 2200/0404* (2013.01); *F02D 2200/0406* (2013.01); *F02D 2200/501* (2013.01)

(58) Field of Classification Search
CPC ....... F02D 2200/0406; F02D 2200/501; F02D 2200/0418; F02D 2200/0812; B60Y 2200/143; B60Y 2200/221; B60Y 2200/14; F02B 27/005; F02M 35/161; F02M 35/10013; F02M 35/10137; F02M 35/10262; F02M 35/164; B60K 13/00; B60K 13/02
See application file for complete search history.

(56) References Cited

U.S. PATENT DOCUMENTS

| | | | |
|---|---|---|---|
| 5,794,733 | A | 8/1998 | Stosel et al. |
| 5,899,196 | A | 5/1999 | Chite |
| 2005/0155575 | A1 | 7/2005 | Ikeda et al. |
| 2010/0224158 | A1* | 9/2010 | Oakes ............... F02M 35/116 123/184.47 |
| 2014/0165961 | A1* | 6/2014 | Patel ............... F02M 35/10255 123/337 |

FOREIGN PATENT DOCUMENTS

| | | |
|---|---|---|
| CN | 1746470 A | 3/2006 |
| CN | 104066963 A | 9/2014 |
| DE | 10053145 A1 | 5/2002 |
| GB | 2365064 A | 2/2002 |
| GB | 2371787 A | 8/2002 |
| JP | H10885349 A | 4/1996 |
| JP | H10331699 A | 12/1998 |
| JP | 2004106773 A | 4/2004 |
| JP | 2013238159 A | 11/2013 |
| WO | 2009082272 A1 | 7/2009 |
| WO | 2013184045 A1 | 12/2013 |

OTHER PUBLICATIONS

International Search Report and Written Opinion for International Patent Application No. PCT/BR2015/000185, dated Jan. 5, 2017, 10 pages.

International Preliminary Report on Patentability for International Patent Application No. PCT/BR2015/000185, dated Jun. 21, 2018, 7 pages.

Extended European Search Report for European Patent Application No. 15909967.0, dated Jun. 3, 2019, 8 pages.

Examination Report for European Patent Application No. 15909967.0, dated Sep. 4, 2020, 4 pages.

First Office Action for U.S. Appl. No. 201580085207.6, dated Nov. 23, 2020, 20 pages.

* cited by examiner

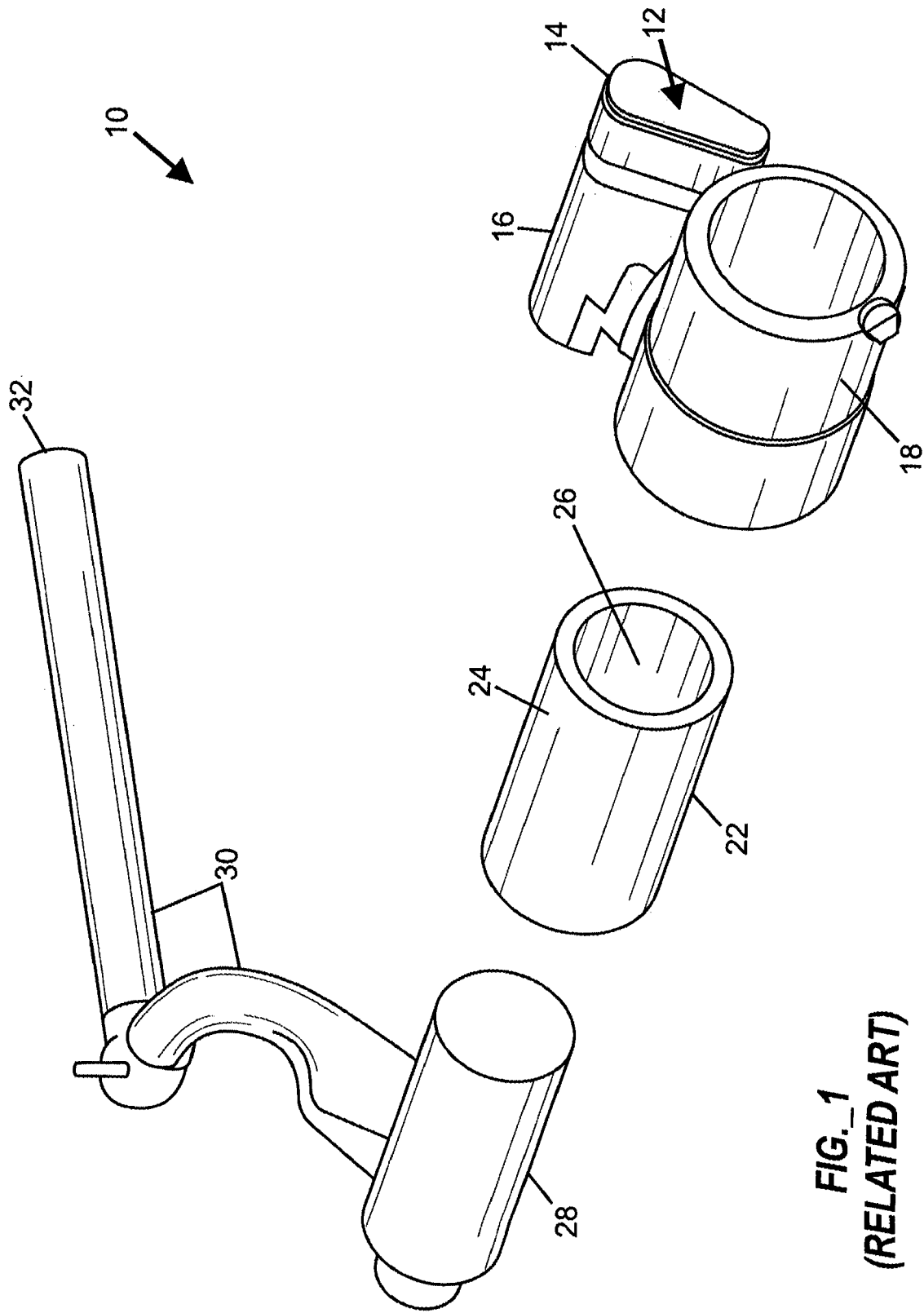
FIG._1
(RELATED ART)

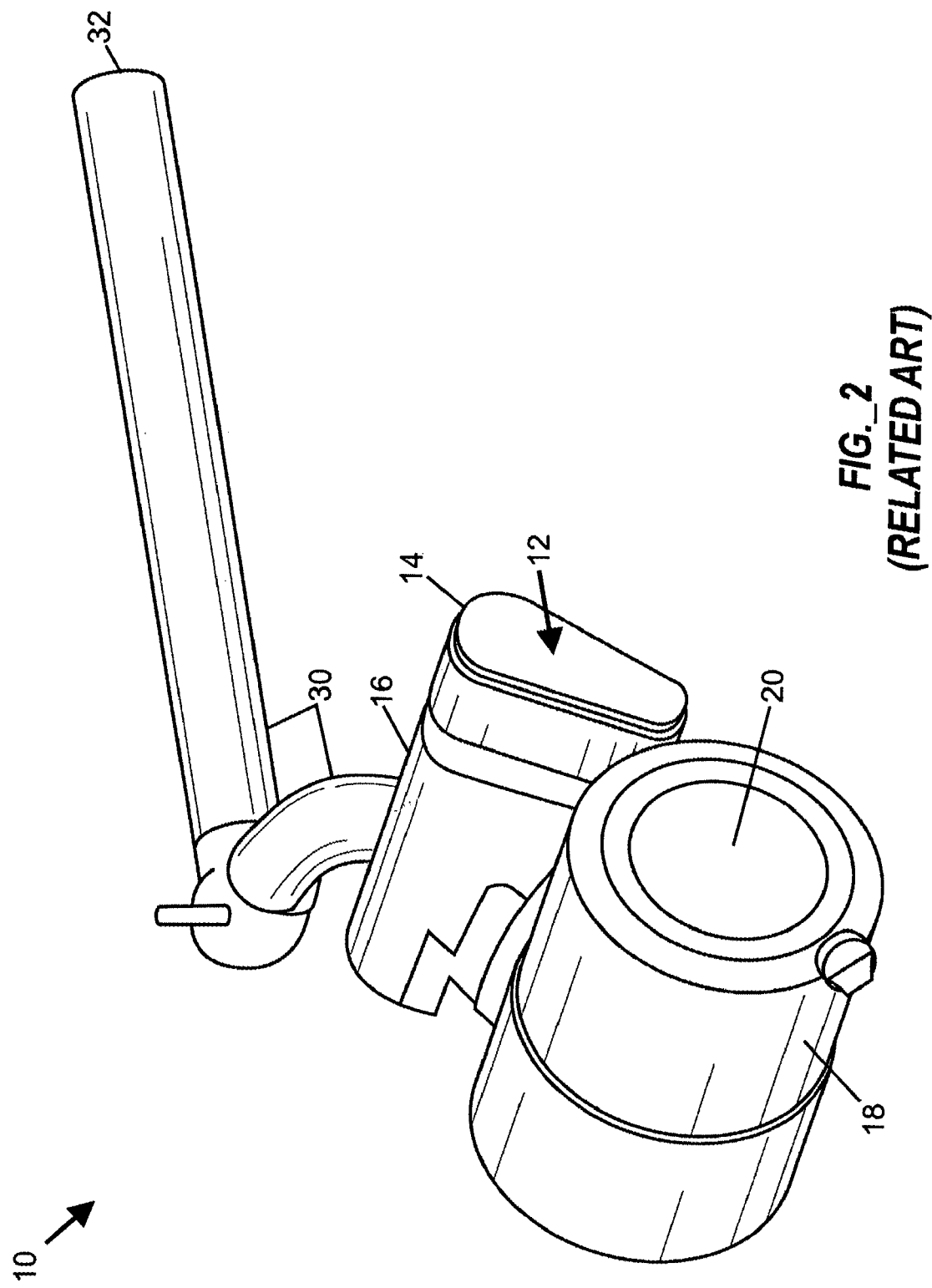
FIG._2
(RELATED ART)

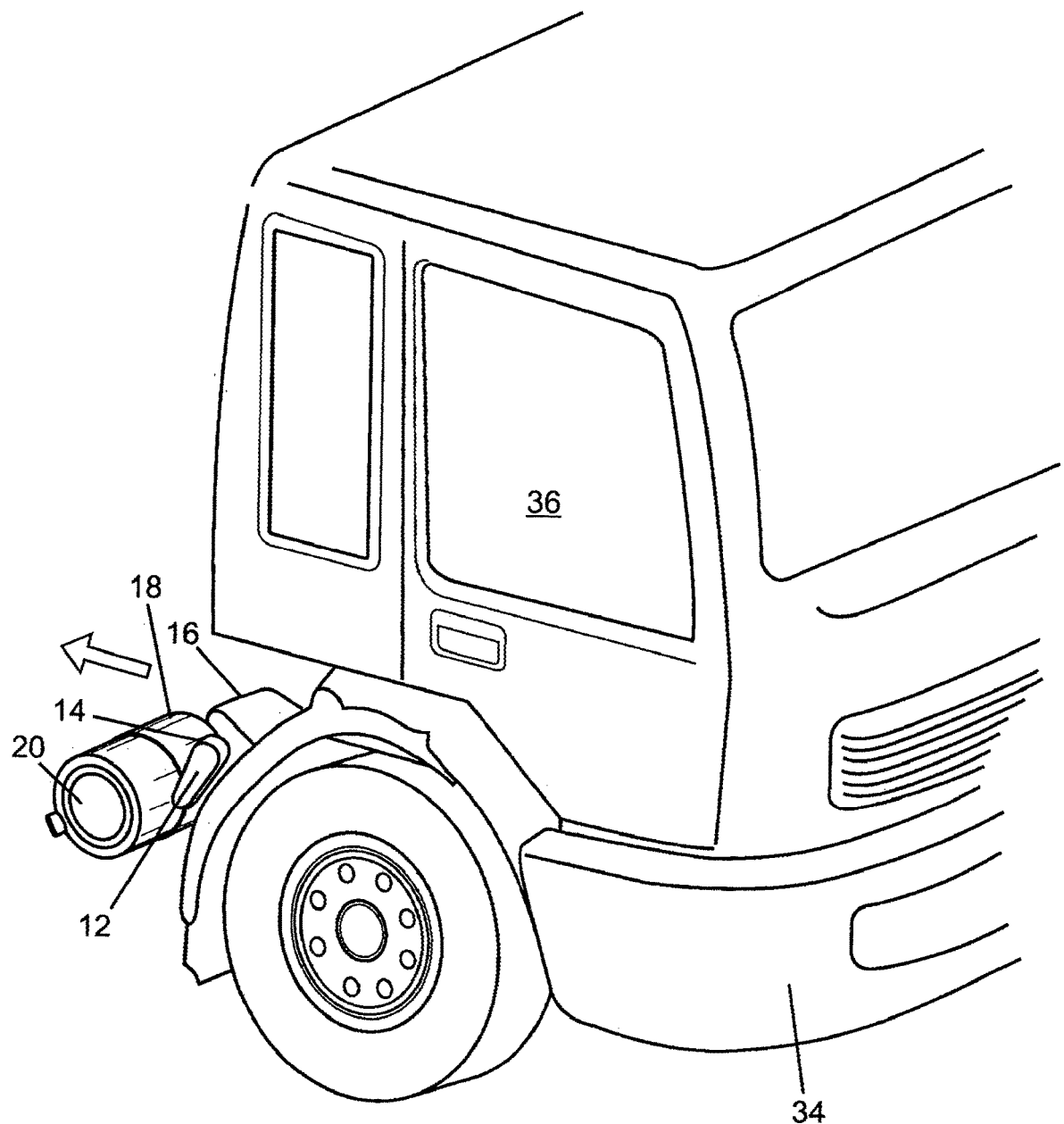
FIG._3
(RELATED ART)

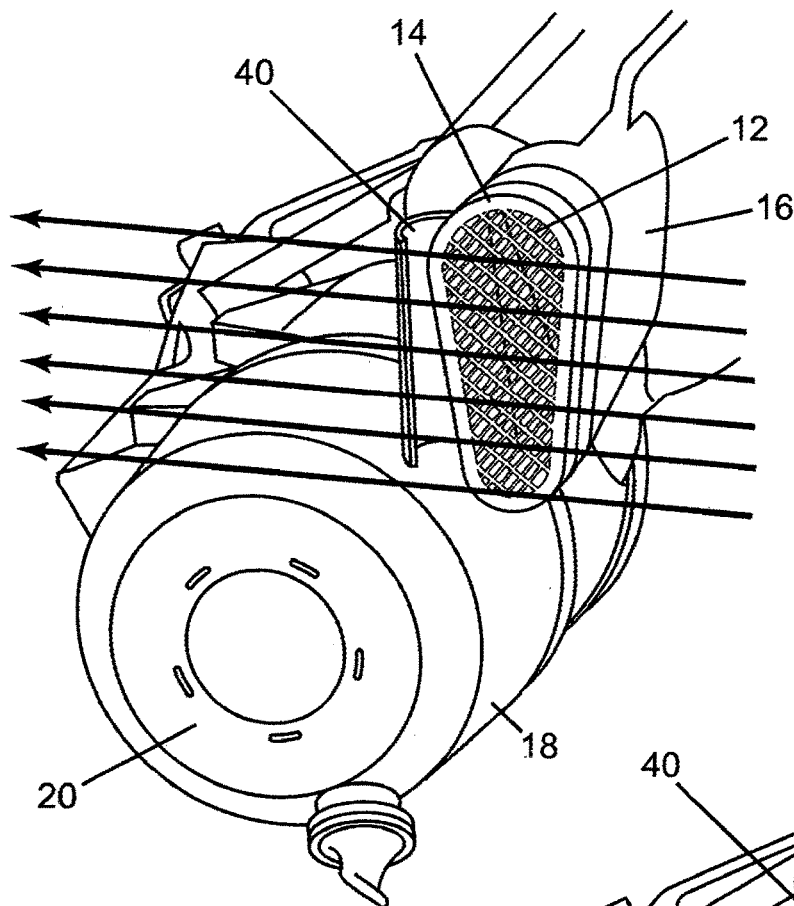
FIG._4A
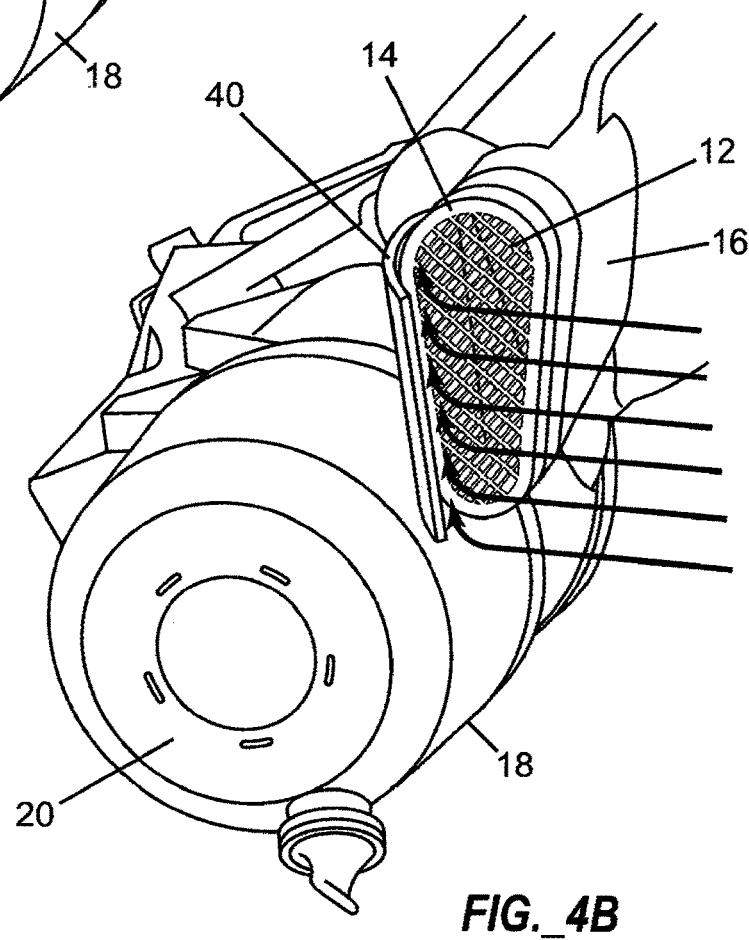
FIG._4B

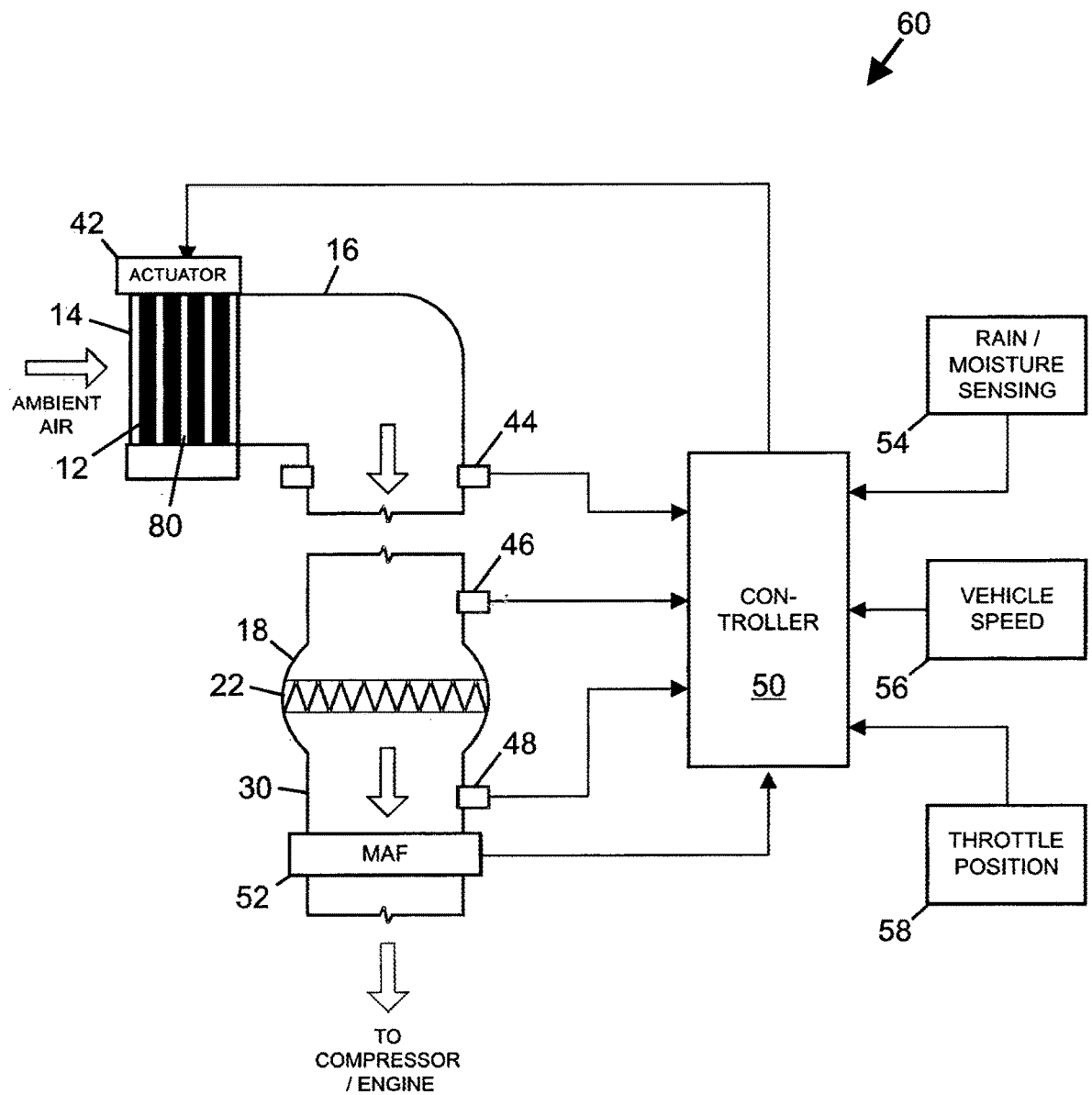
*FIG._5*

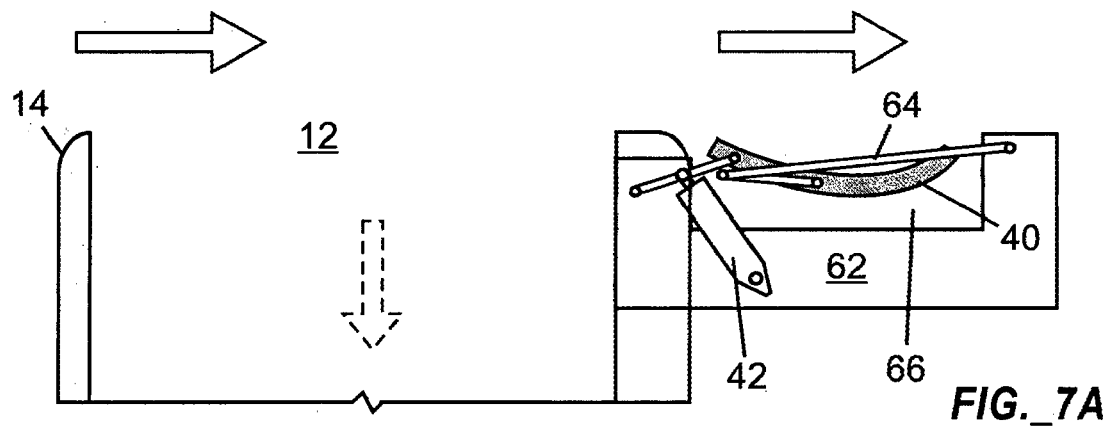
FIG._7A
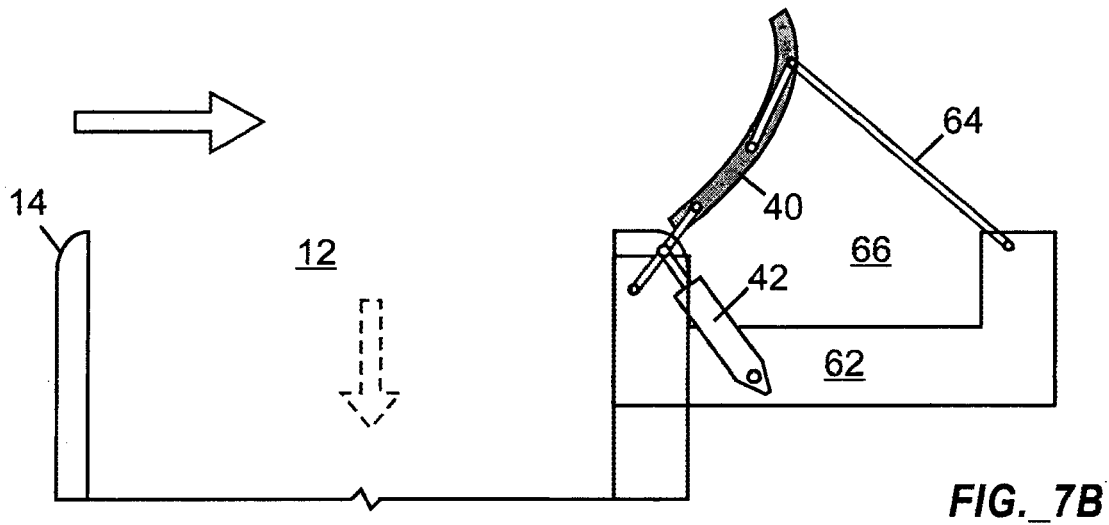
FIG._7B
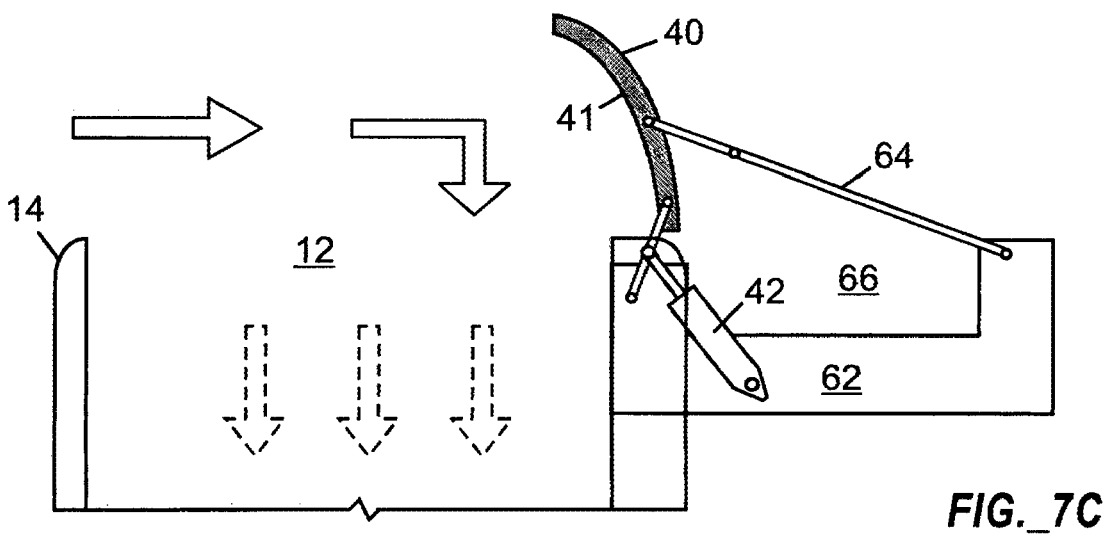
FIG._7C

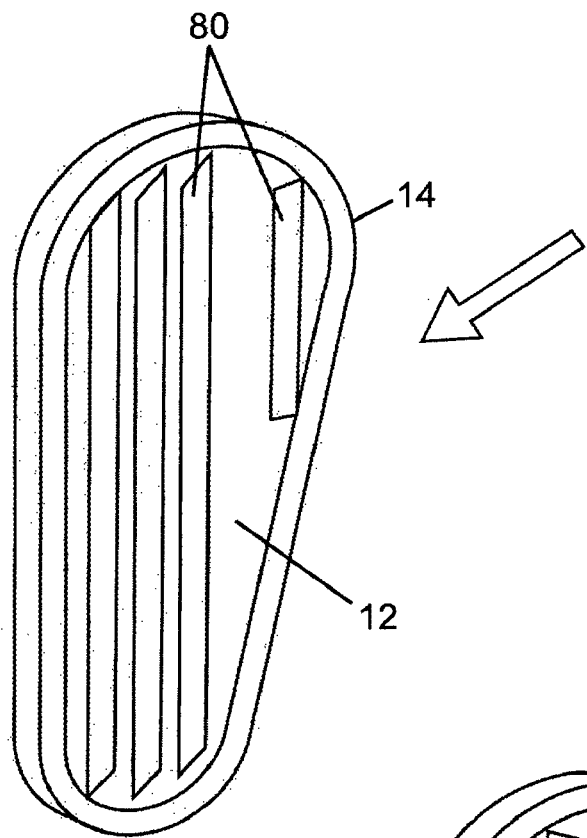
FIG._8A
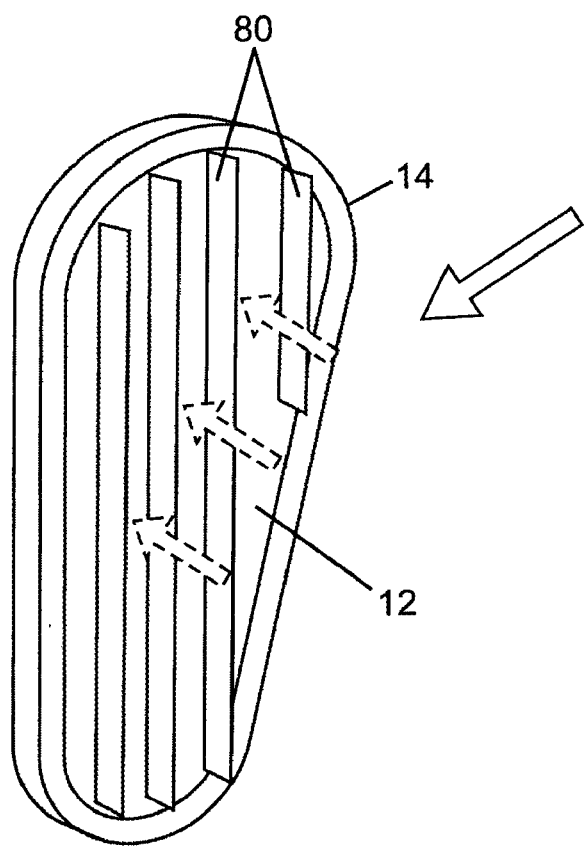
FIG._8B

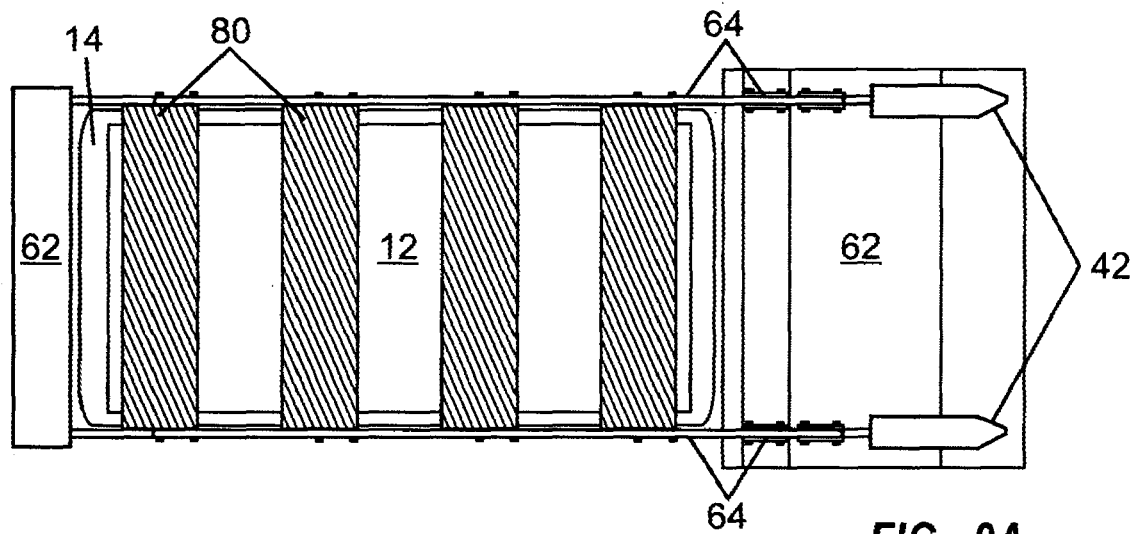
FIG._9A
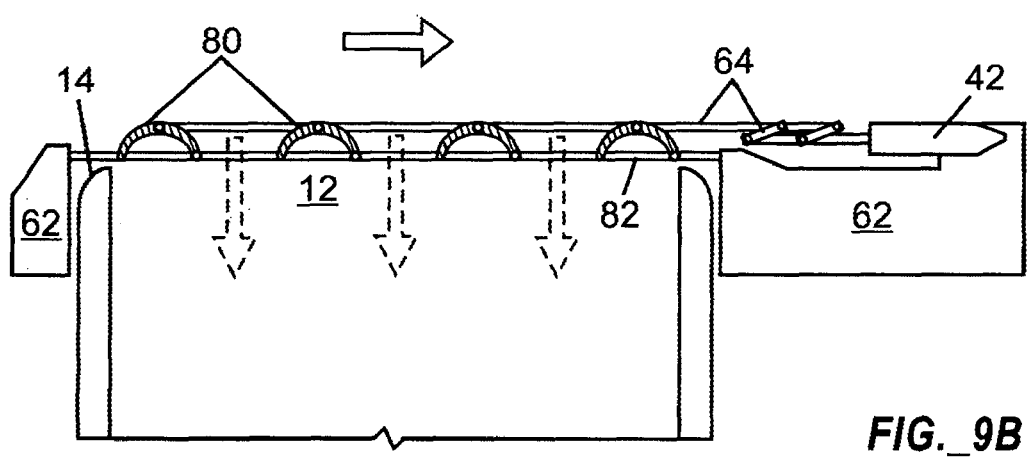
FIG._9B
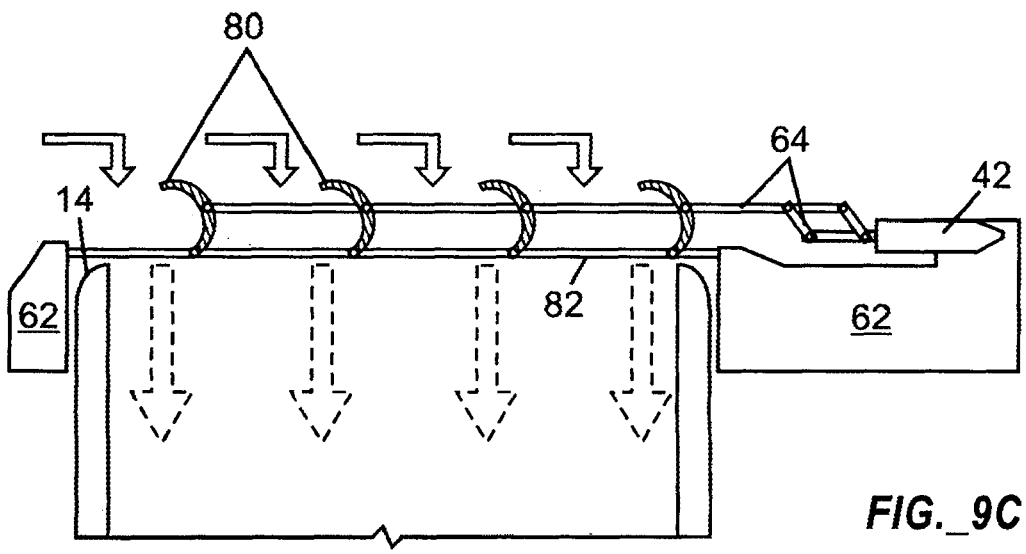
FIG._9C

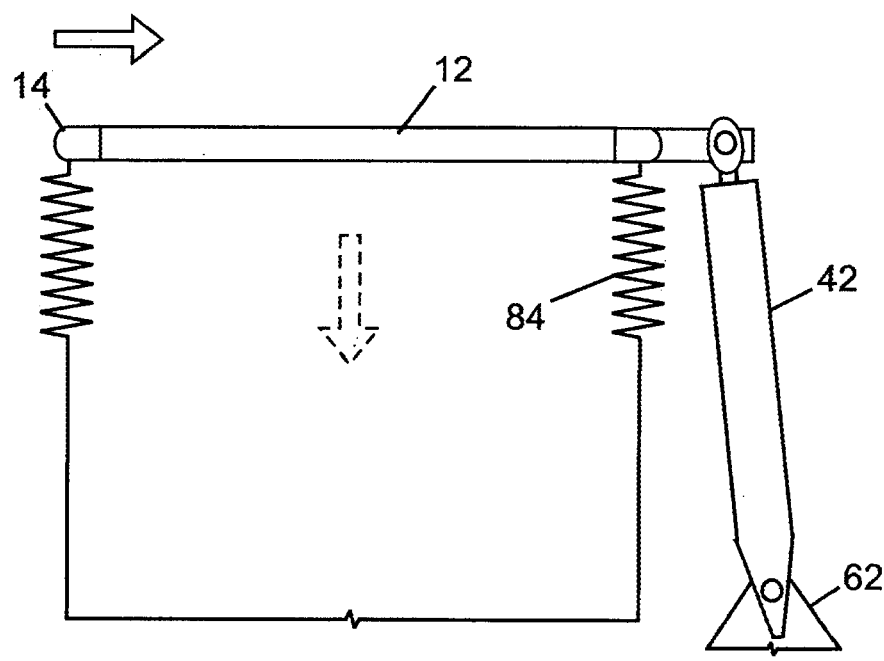
FIG._11A
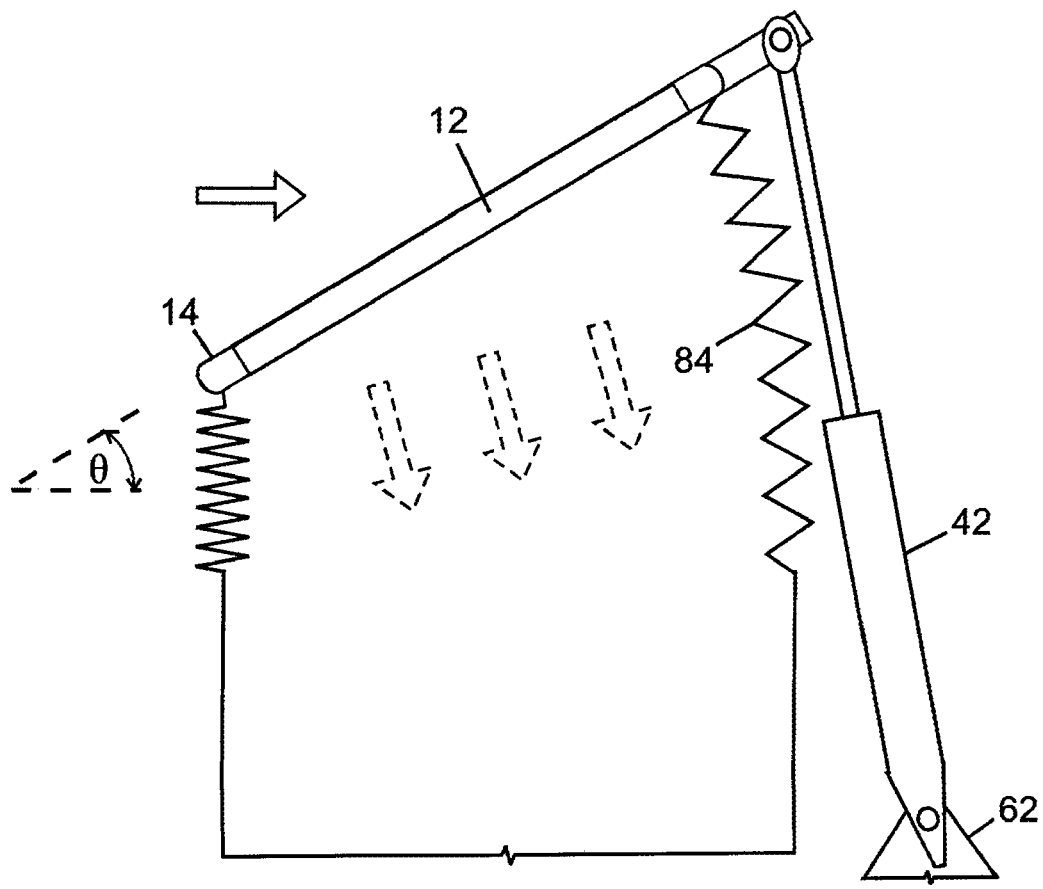
FIG._11B

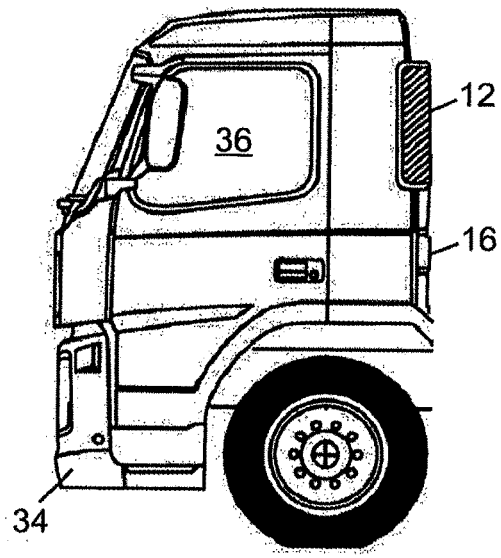
FIG._12A
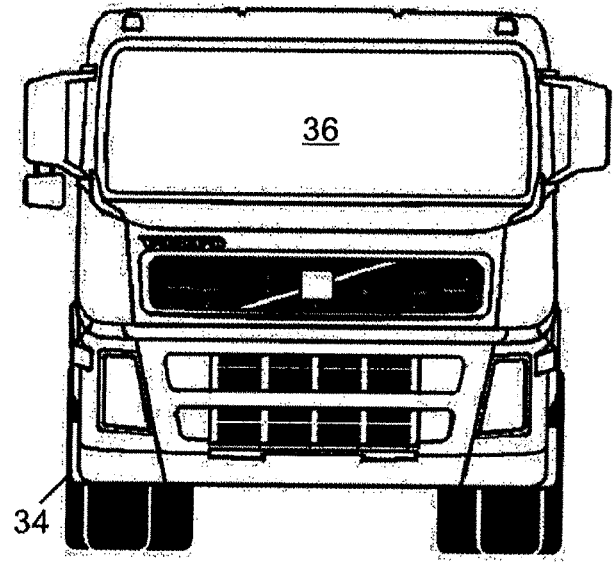
FIG._12B
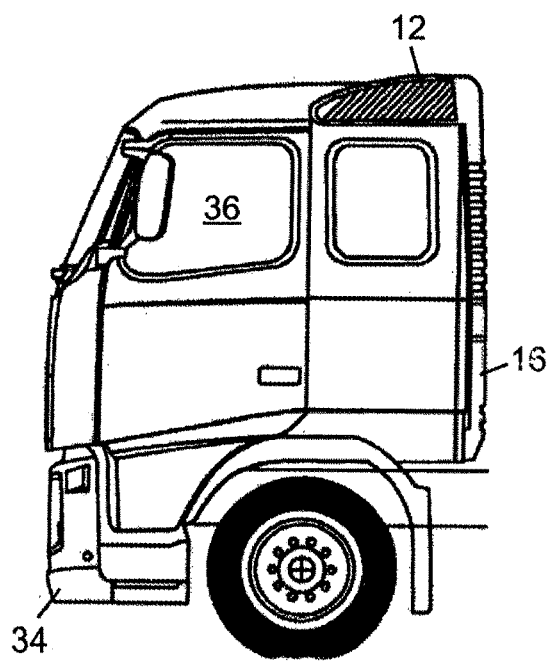
FIG._13A
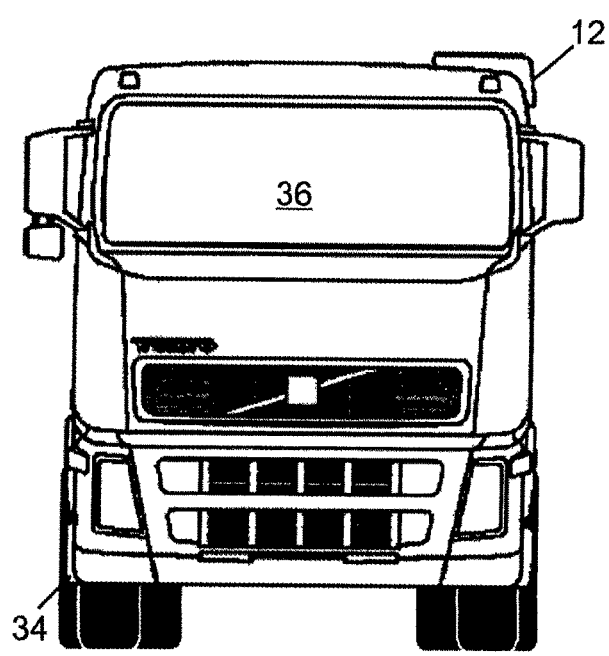
FIG._13B

ACTIVE COMBUSTION AIR INTAKE SYSTEM FOR TRUCK, TRACTOR, OR BUS VEHICLE

This application is a 35 USC 371 national phase filing of PCT/BR2015/000185, filed on Dec. 11, 2015, which is incorporated herein by reference in its entirety.

FIELD OF THE DISCLOSURE

The present disclosure relates generally to a combustion air intake apparatus for a truck or tractor vehicle (e.g., usable for hauling a semi-trailer) for highway use, or a bus vehicle for highway use, and to a method of supplying combustion air to an engine of such a vehicle.

BACKGROUND

The cost of fuel is typically the largest cost associated with operating a tractor trailer. A tractor trailer in regular full-time may use 20,000 gallons or more of diesel fuel per year. Fuel costs are similarly high for bus vehicles. Even small improvements in fuel efficiency can have a significant impact on aggregate fuel costs for operators of truck, tractor, or bus vehicles. Decreases in fuel consumption would also lead to concomitant reductions in emissions such as NOx, SOx, particulates, and unburned hydrocarbons.

Combustion air is supplied to an engine of a truck, tractor, or bus vehicle via an air intake system. Components of a conventional air intake apparatus 10 for a truck or tractor vehicle are shown in FIG. 1. An air inlet opening 12 defined by a peripheral frame 14 is arranged upstream of a neck 16 and a filter housing 18 that is arranged to contain an air filter 22 having an upstream (dirty) surface 24 and a downstream (clean) surface 26. A removable filter housing cap (not shown) may be positioned to cover one end of the filter housing 18. A receiver 28 arranged proximate to the downstream surface 26 of the air filter 22 receives filtered air from the air filter 22 and conveys filtered air to downstream pipes 30. An outlet 32 of the pipes 30 may supply filtered air to downstream components (not shown) such as an air compressor stage of a turbocharger. FIG. 2 is an assembled view of the components of FIG. 1. FIG. 3 shows a portion of a truck or tractor vehicle 34 including the combustion air intake system components of FIGS. 1 and 2, with the air inlet opening 12 being arranged behind a front wheel, and generally behind and below a passenger cabin 36, of the vehicle 34. A hollow arrow proximate to the filter housing 18 shows the general direction of air flowing past the truck or tractor vehicle 34 when the vehicle 34 is traveling in a forward direction.

A flow of air through a combustion air intake system inherently experiences a pressure drop caused by frictional forces, thereby reducing static pressure of air supplied to a turbocharger compressor and downstream combustion chambers. Pressure drop is proportional to the square of flow rate through the intake system. Pressure drop is exacerbated (and static pressure within an air intake system is reduced) when the filter element of an air intake system is dirty. A reduction in static pressure of air supplied to an internal combustion engine limits the engine's volumetric efficiency, thereby reducing power output and reducing fuel economy. In extreme cases, insufficient static pressure of air transiting through an air intake system may cause damage to a turbocharger.

Combustion air intake systems of conventional truck and tractor vehicles frequently include air inlet openings that are approximately parallel to a direction of forward vehicle travel. Such configuration beneficially reduces ingestion of particulate matter and precipitation (e.g., rain and snow) into an air intake system when the vehicle is in forward motion, relative to a forward-facing ram-air configuration (with an inlet opening perpendicular to the direction of forward travel) provided by hood scoops employed by certain high performance automobiles. Due to the economic need to maintain truck and tractor vehicles in nearly constant operation, a risk of ingesting undue amounts of particulate matter and/or precipitation is typically considered unacceptable by operators of truck or tractor vehicles. Similar considerations exist for bus vehicles.

A need exists in the art for improvements in combustion air intake apparatuses for highway truck, tractor, or bus vehicles to overcome, imitations of conventional devices.

SUMMARY

The present disclosure is directed to a combustion air intake apparatus for a truck, tractor, or bus vehicle for highway use, with the apparatus including a selectively deployable air deflecting element that uses dynamic air pressure created by vehicle motion to increase static air pressure within the intake apparatus under appropriate conditions without eliminating exposure of an air inlet opening to ambient air, preferably while avoiding undue ingestion of particulate matter and/or precipitation.

In one aspect, the disclosure relates to a combustion air intake apparatus that includes a frame defining an air inlet opening in fluid communication with the combustion air intake apparatus, at least one air deflecting element proximate to the frame, and a controller operatively coupled with at least one actuator to selectively deploy or retract the at least one air deflecting element. The at least one air deflecting element includes a retracted position and includes a deployed position in which the at least one air deflecting element is arranged to deflect air into the air inlet opening while the truck, tractor, or bus vehicle is traveling in a forward direction. The controller is configured to control deployment or retraction of the at least one air deflecting element responsive to at least one signal indicative of one or more sensed parameters . . . . For example, one (or optionally, multiple) of the following sensed parameters may be used: (i) forward speed of the truck, tractor, or bus vehicle, (ii) air pressure downstream of the air inlet opening, or (iii) throttle position of the truck, tractor, or bus vehicle. In certain embodiments, deployment or retraction of the at least one air deflecting element is controlled (or further controlled) responsive to one or more signals indicative of at least one of the following parameters: (A) presence of precipitation proximate to the truck, tractor, or bus vehicle; or (B) presence of particulate material proximate to the truck, tractor, or bus vehicle. The air inlet opening is open to admit ambient air into the air intake apparatus when the at least one air deflecting element is in the deployed position and when the at least one air deflecting element is in the retracted position. In certain embodiments, the air inlet opening is arranged non-perpendicular to the forward direction of travel of the truck, tractor, or bus vehicle, and may be arranged generally behind or above a passenger cabin of the vehicle. In certain embodiments, the at least one air deflecting element includes at least one moveable deflector plate or flap proximate to the air inlet opening. The moveable deflector plate or flap may be arranged generally behind the air inlet opening, relative to the forward direction of travel of the truck, tractor, or bus vehicle, when the at least one moveable deflector plate or flap is in a non-deployed or retracted state. In certain embodiments, the at least one air deflecting element includes multiple moveable louvers arranged proximate to the air inlet opening. In certain embodiments, the at least one air deflecting element includes a moveable duct portion configured to alter an angular position of the air inlet opening.

In another aspect, the disclosure relates to a method of supplying combustion air to a truck, tractor, or bus vehicle for highway use. The method includes utilizing a controller operatively coupled with at least one actuator to selectively deploy or retract at least one air deflecting element proximate to a frame defining an air inlet opening. The at least one air deflecting element includes a retracted position and includes a deployed position in which the at least one air deflecting element is arranged to deflect air into the air inlet opening while the truck, tractor, or bus vehicle is traveling in a forward direction. The air inlet opening is open to admit ambient air into a combustion air intake apparatus when the at least one air deflecting element is in the deployed position and when the at least one air deflecting element is in the retracted position. The selective deployment or retraction of the at least one air deflecting element is responsive to at least one signal indicative of one or more sensed parameters. For example, one (or optionally, multiple) of the following sensed parameters may be used: (i) forward speed of the truck, tractor, or bus vehicle, (ii) air pressure downstream of the air inlet opening, or (iii) throttle position of the truck, tractor, or bus vehicle. In certain embodiments, deployment or retraction of the at least one air deflecting element is responsive (or is additionally responsive) to one or more signals indicative of at least one of the following parameters: (A) presence of precipitation proximate to the truck, tractor, or bus vehicle; or (B) presence of particulate material proximate to the truck, tractor, or bus vehicle. In certain embodiments, the air inlet opening is arranged non-perpendicular to the forward direction of travel of the truck, tractor, or bus vehicle, and may be arranged generally behind or above a passenger cabin of the vehicle. In certain embodiments, the at least one air deflecting element includes at least one moveable deflector plate or flap proximate to the air inlet opening. In certain embodiments, the at least one air deflecting element includes multiple moveable louvers arranged proximate to the air inlet opening. In certain embodiments, the at least one air deflecting element includes a moveable duct portion configured to alter an angular position of the air inlet opening.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawings.

BRIEF DESCRIPTION OF THE DRAWINGS

FIG. 1 is an exploded perspective view of components of a conventional combustion air intake system for a truck or tractor vehicle and suitable for mounting generally below and behind a passenger cabin.

FIG. 2 is an assembled perspective view of the combustion air intake system components of FIG. 1.

FIG. 3 is a perspective view of a portion of a truck or tractor vehicle including the assembled combustion air intake system components of FIG. 2.

FIG. 4A is a perspective view of components of a combustion air intake system for a truck or tractor vehicle including a selectively deployable deflector element embodying a deflector plate or flap in a retracted position according to one embodiment of the present disclosure.

FIG. 4B is a perspective view of the combustion air intake system components of FIG. 4A with the deflector element in a deployed position.

FIG. 5 is a schematic diagram illustrating a combustion air intake system for a truck, tractor, or bus vehicle including a selectively deployable deflector element, an actuator, a controller, and sensing elements according to one embodiment of the present disclosure.

FIGS. 7A-7C are top schematic views of a selectively deployable deflector plate or flap and an actuator proximate to an air inlet opening of a combustion air intake system, with the deflector element in three different positions, respectively, according to one embodiment of the present disclosure.

FIGS. 8A and 8B are perspective schematic views of a selectively deployable deflector element embodying multiple louvers proximate to an air inlet opening of a combustion air intake system, with the louvers in a retracted position and a deployed position, respectively, according to one embodiment of the present disclosure.

FIG. 9A is an elevation view of multiple louvers and actuators arranged proximate to an air inlet opening of a combustion air intake system, with the louvers in a retracted position, according to one embodiment of the present disclosure.

FIG. 9B is a top plan view of the louvers, actuator, and air inlet opening of FIG. 9A, with the louvers in a retracted position.

FIG. 9C is a top plan view of the louvers, actuator, and air inlet opening of FIGS. 9A and 9B, with the louvers in a deployed position.

FIGS. 11A and 11B are schematic top plan views of a selectively deployable deflector element embodying a moveable duct portion of a combustion air intake system, with the moveable duct portion in a retracted position and a deployed position, respectively, according to one embodiment of the present disclosure.

FIGS. 12A and 12B provide side elevation and front elevation views, respectively, of a front portion of a truck or tractor vehicle including an air intake located generally behind the passenger cabin.

FIGS. 13A and 13B provide side elevation and front elevation views, respectively, of a front portion of a truck or tractor vehicle including an air intake located above the passenger cabin.

DETAILED DESCRIPTION

Figure 6:
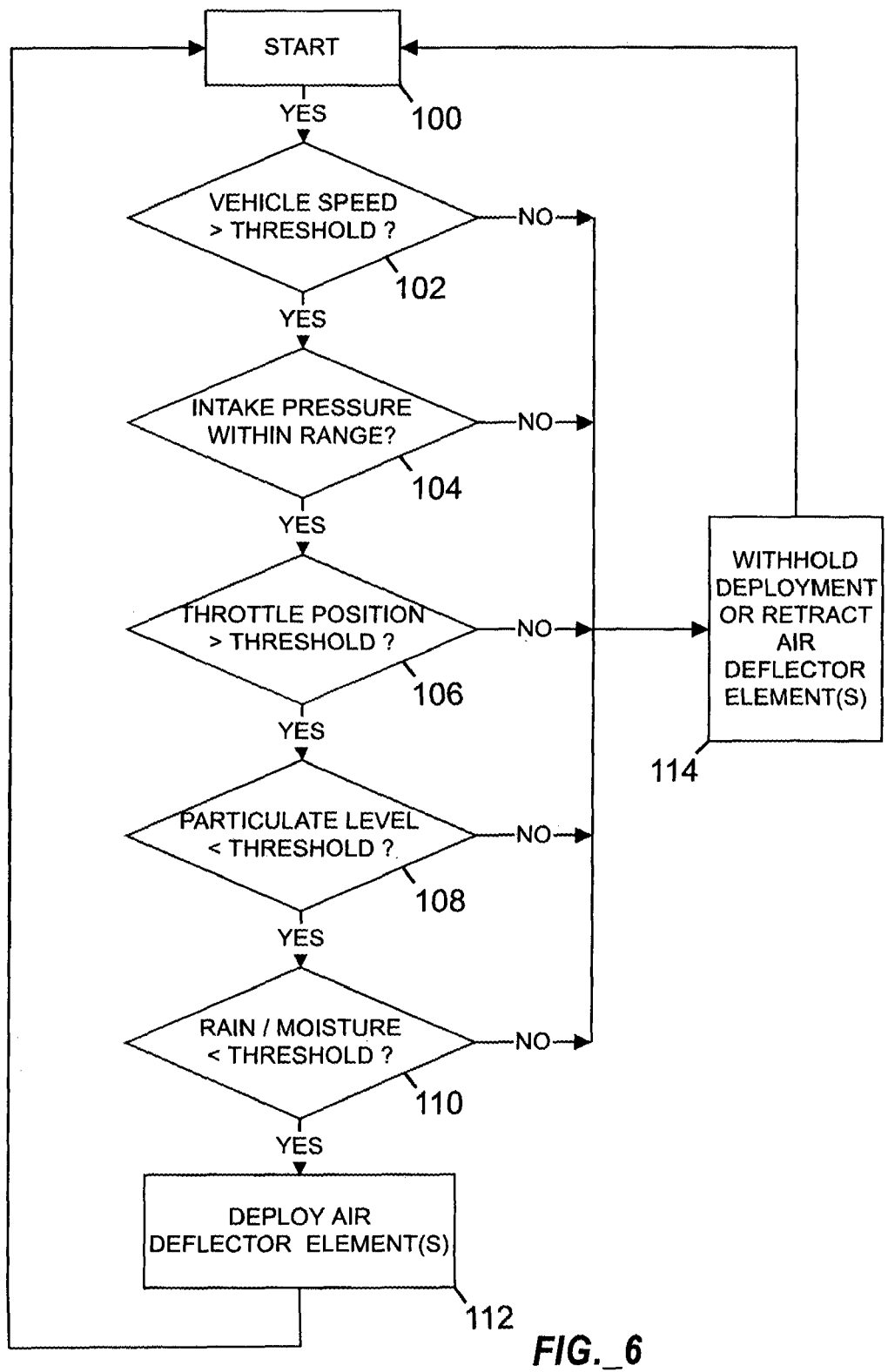
FIG. 6 is a flowchart outlining steps of a method for determining whether to deploy or retract a selectively deployable deflector element of a combustion air intake system for a truck, tractor, or bus vehicle according to one embodiment of the present disclosure.

The present disclosure is directed to a combustion air intake apparatus for a truck, tractor, or bus vehicle for highway use wherein the air intake apparatus includes a selectively deployable air deflecting element that uses dynamic air pressure created by vehicle motion to increase static air pressure within the intake apparatus under appropriate conditions without eliminating exposure of an air inlet opening to ambient air, preferably while avoiding undue ingestion of particulate matter and/or precipitation. A controller is operatively coupled with at least one actuator to selectively deploy or retract at least one air deflecting element proximate to a frame. The at least one air deflecting element includes a retracted position and includes a deployed position in which the at least one air deflecting element is arranged to deflect air into the air inlet opening while the truck, tractor, or bus vehicle is traveling in a forward direction. Deployment or retraction of the at least one air deflecting element is controlled responsive to at least one signal indicative of one or more sensed parameters. For example, one (or optionally, multiple) of the following sensed parameters may be used: (i) forward speed of the truck, tractor, or bus vehicle, (ii) air pressure downstream of the air inlet opening, or (iii) throttle position of the truck, tractor, or bus vehicle. In certain embodiments, deployment or retraction (including non-deployment) of the at least one air deflecting element is controlled, or is additionally controlled, responsive to one or more signals indicative of at least one of the following parameters: (A) presence of precipitation proximate to the truck, tractor, or bus vehicle; or (B) presence of particulate material proximate to the truck, tractor, or bus vehicle. Providing an air inlet opening that is open to admit ambient air into the combustion air intake apparatus regardless of a state of deployment of the at least one air deflecting element (i.e., when the at least one air deflecting element is in the deployed position and when the at least one air deflecting element is in the retracted position) ensures that a constant flow of combustion air is available to the truck, tractor, or bus vehicle, even in the case of unintended failure of a controller, an actuator, or an air deflecting element.

By controlling deployment of an air deflecting element responsive to forward speed of the truck, tractor, or bus vehicle, air pressure downstream of the air inlet opening, and/or throttle position of the truck, tractor, or bus vehicle, an air deflecting element may be employed under conditions when additional volumetric efficiency may be beneficial to improve volumetric efficiency of the vehicle engine. When the vehicle is traveling at low speed, pressure drop through a combustion air intake system may be low, and combustion air demands may be relatively low. Even when the vehicle is traveling at relatively high speed, the same conditions (i.e., low intake system pressure drop and low combustion air demand) may present if the vehicle is traveling downhill and the engine throttle position is near zero. At least one signal indicative of air pressure at a position downstream of the air inlet opening (e.g., preferably at a position also downstream of the air filter) may additionally or alternatively be used in determining whether an air deflecting element should be deployed. If conditions suggest that additional volumetric efficiency is not required, then withholding deployment of an air deflecting element may beneficially reduce aerodynamic drag, thereby contributing to improved fuel economy.

By controlling deployment or retraction (including non-deployment) of the at least one air deflecting element responsive to presence of precipitation proximate to the truck, tractor, or bus vehicle, or presence of particulate material proximate to the truck, tractor, or bus vehicle, undue ingestion of precipitation and particulate material into an air intake system may be avoided. Reducing ingestion of particulate material (e.g., dust) may extend intervals between air filter changes, and may reduce rapid filter clogging that might otherwise detrimentally affect fuel economy and/or cause turbocharger damage. Reducing ingestion of precipitation (including snow) is desirable to prevent rapid accumulation that could block an air intake system.

FIGS. 4A-4B illustrate components of a combustion air intake system for a truck or tractor vehicle (similar to the vehicle illustrated in FIG. 3), with the addition of a selectively deployable deflector element embodied in a moveable deflector plate or flap 40. The deflector plate or flap 40 is positioned proximate to a trailing edge of an air inlet opening 12 defined by a peripheral frame 14, which is upstream of a neck 16 that leads to a filter housing 18 closed by a removable filter housing cap 20.

As shown in FIG. 4A, the moveable deflector plate or flap 40 is arranged in a non-deployed or retracted state, positioned generally behind the air inlet opening 12, the frame 14, and the neck 16. Positioning the moveable deflector plate or flap 40 generally behind these components (relative to the forward direction of travel of the truck or tractor vehicle) when the moveable deflector plate or flap 40 is in a non-deployed or retracted state may reduce aerodynamic drag. When the moveable deflector plate or flap 40 is in a non-deployed or retracted state, a flow of passing air (indicated by parallel arrows in FIG. 4A) counter to the direction of forward travel of the vehicle is not deflected by the moveable deflector plate or flap 40.

FIG. 4B shows the moveable deflector plate or flap 40 in a deployed position, causing a flow of passing air (indicated by solid arrows) to be deflected into the air inlet opening 12. In the deployed state, the moveable deflector plate or flap 40 uses dynamic air pressure created by vehicle motion to increase static air pressure within the air intake components downstream of the air inlet opening 12. As shown in FIGS. 4A-4B, in certain embodiments, a moveable deflector plate or flap 40 may be curved in a generally concave direction toward the air inlet opening 12 to facilitate a smooth change of direction for air being deflected into the air inlet opening 12. As shown in FIGS. 4A-4B, the frame 14 may support an air-permeable mesh or grille spanning over the air inlet opening 12 to prevent or reduce introduction of foreign matter into the air intake system.

Before describing further implementations of selectively deployable deflector elements (which may include a moveable plate or flap, moveable louvers, and/or a moveable duct portion configured to alter an angular position of the air inlet opening), control and sensing elements that may be utilized with combustion air intake systems described herein will be described.

FIG. 5 is a schematic diagram illustrating a combustion air intake system 60 for a truck, tractor, or bus vehicle including a selectively deployable deflector element 80 (e.g., embodying louvers), an actuator 42, a controller 50, and various sensing elements. The selectively deployable deflector element 80 is arranged proximate to an air inlet opening 12 defined by a frame 14. The actuator 42 may include any suitable type, such as pneumatic, hydraulic, or electromechanical actuators. In certain embodiments, the selectively deployable deflector element 80 and the actuator 42 are arranged external to the air inlet opening 12, the frame 14, and any air-conveying ducts or pipes associated with the air intake system 60. The air inlet opening 12 is arrange to convey ambient air to conduits including a neck 16, an air filter 22 (contained in a filter housing 18), and downstream pipes 30. Positioned within the conduits are a particulate sensor 44, a first pressure sensor 46 (e.g., disposed upstream of the air filter 22), a second pressure sensor 48 (e.g., disposed downstream of the air filter 22), and a mass air flow (MAF) sensor 52. Signals of the preceding sensors are supplied to the controller 50, which may include a microprocessor or microcontroller in certain embodiments. The controller 50 is further arranged to receive signals from a rain or moisture sensor 54, a vehicle speed sensor 56, and a throttle position sensor 58. In certain embodiments, the signals derived from one or more of the above-mentioned sensors may be integrated or combined, and/or supplied via a communication bus. In certain embodiments, a rain or moisture signal may be obtained by simply detecting operation of vehicle windshield wipers. In operation of the combustion air intake system 60, ambient air flows through the air inlet opening 12, the neck 16, the filter housing 18, the air filter 22, and the MAF sensor 52. Upon detection by the controller 50 of a condition indicating that it would be desirable to increase static air pressure in the combustion air intake system 60 (such as detection of vehicle speed above a predetermined threshold, intake pressure within a specified range, and/or throttle position above a predetermined threshold, while the presence of particulate material is below a predetermined threshold and the presence of rain or moisture is below a predetermined threshold), the selectively deployable deflector element 80 may be deployed by issuance of an appropriate signal by the controller 50 to the actuator 42. Conversely, if the selectively deployable deflector element 80 is already deployed and the controller 50 detects a condition indicating that retraction would be appropriate, then the controller 50 may issue an appropriate signal to the actuator 42 to retract the selectively deployable deflector element 80.

FIG. 6 is a flowchart outlining steps of a method for determining whether to deploy or retract a selectively deployable deflector element of a combustion air intake system for a truck, tractor, or bus vehicle according to one embodiment of the present disclosure. The method is initiated at block 100. At block 102, vehicle speed is compared to a predetermined threshold. If vehicle speed is too low, then there is little benefit to deploying an air deflecting element. In one embodiment, a vehicle speed threshold of about 50 kilometers per hour (km/hr) may be used to determine whether it may be beneficial to deploy an air deflecting element. At block 104, pressure at one or more points within the air intake system is compared to a predetermined range. In certain embodiments, intake pressure downstream of an air filter is considered. In certain embodiments, if intake pressure downstream of an air filter is very low while combustion air demand is low (as may be determined by throttle position, for example), then there may be no benefit to deploying an air deflecting element, such that a minimum pressure threshold may be used for determining whether deployment may be beneficial. For example, in one embodiment, an air deflecting element may be deployed when pressure downstream of an air filter is higher than 2 kPA, which may correspond to a relatively high air flow velocity and thus vehicle speed. Conversely, if intake pressure downstream of an air filter is too low while combustion air demand is high (as may be determined from throttle position) and vehicle speed is above a specified threshold, then this may suggest it would beneficial to deploy an air deflecting element to increase static pressure in the air intake system, to increase volumetric efficiency and avoiding turbocharger damage. In certain embodiments, a differential pressure across an air filter may additionally or alternatively be considered. At block 106, throttle position is compared to a predetermined threshold, since a large throttle demand signal indicate that deployment of an air deflecting element would be beneficial. In certain embodiments, at least two of, or all three of, air pressure, vehicle speed, and/or throttle position may be utilized in determining whether to deploy an air deflector element. At blocks 108 and 110, particulate and rain/moisture levels are compared to a predetermined threshold, since presence of excessive amounts of particulate or precipitation would suggest that deployment of an air deflecting element should be withheld. Block 112 represents deployment of an air deflecting element if appropriate conditions are met, whereas block 114 represents withholding deployment or retraction of an air deflecting element if the converse is true. Although not shown in FIG. 6, an appropriate delay timer may be implemented to prevent hysteresis or any other unnecessarily rapid changes in state of deployment of an air deflector element.

FIGS. 7A-7C are top schematic views of a moveable deflector plate or flap 40 and an actuator 42 proximate to an air inlet opening 12 defined by a frame 14 of a combustion air intake system, with the moveable deflector plate or flap 40 in three different positions, respectively, according to one embodiment of the present disclosure. The actuator 42 is mounted to a support structure 62 and is coupled with the moveable deflector plate or flap 40 through linkages 64, which may include a multi-bar mechanism with pivot points. The support structure 62 may include a cavity 66 arranged to receive the moveable deflector plate or flap 40 in an undeployed or retracted state, as shown in FIG. 7A. In such a state, passing air (indicated by horizontal arrows) flowing counter to a forward vehicular travel direction is not deflected by the moveable deflector plate or flap 40. FIG. 7B shows the moveable deflector plate or flap 40 in an intermediate position between states of non-deployment and deployment. FIG. 7C shows the moveable deflector plate or flap 40 in a deployed state, with one edge thereof being proximate to a trailing edge of the frame 14. In the deployed state, the moveable deflector plate or flap 40 is positioned to deflect a flow of passing air counter to the forward vehicular travel direction to be deflected into the air inlet opening 12, thereby increasing air flow rate and static pressure in the air intake system downstream of the air inlet opening 12. Regardless of the state of deployment of the moveable deflector plate or flap 40, the air inlet opening 12 is exposed to ambient air, and remains non-perpendicular to a forward vehicular travel direction. As shown in FIG. 7C, in certain embodiments, the moveable deflector plate or flap 40 may include a surface 41 that is curved in a generally concave direction toward the air inlet opening 12 to facilitate a smooth change of direction for air being deflected into the air inlet opening 12. Although FIGS. 7A-7C illustrate the moveable deflector plate or flap 40 as being subject to rotational motion, it is to be appreciated that a deflector plate or flap may be subject to translation and/or rotation when moving between deployed and non-deployed states.

FIGS. 8A-8B are schematic views of a selectively deployable deflector element embodying multiple louvers 80 proximate to an air inlet opening 12 defined by a frame 14 of a combustion air intake system. FIG. 8A depicts the louvers 80 in a non-deployed (or retracted) state, with the louvers 80 being positioned generally parallel to a direction of flow of passing air (indicated by a large arrow) that is counter to the forward vehicular travel direction. As shown in FIG. 8A, the louvers 80 include gaps therebetween to permit air to be admitted through the air inlet opening 12 when the louvers 80 are in a non-deployed state. FIG. 8B depicts the louvers 80 in a deployed state, being positioned generally perpendicular to a direction of flow of passing air (indicated by a large arrow), and thereby deflecting at least a portion of a flow of passing air (i.e., air flowing counter to the forward vehicular travel direction) to be deflected into the air inlet opening 12, as indicated by the three small arrows. The air inlet opening 12 is preferably positioned non-perpendicular to a direction of forward vehicular travel.

FIGS. 9A-9C illustrate multiple louvers 80 and actuators 42 arranged proximate to an air inlet opening 12 defined by a frame 14 of a combustion air intake system according to one embodiment of the present disclosure. In FIGS. 9A-9B, the louvers 80 are in an undeployed or retracted state, and in FIG. 9C the louvers 80 are in a deployed state. The louvers 80 include gaps therebetween to permit air to be admitted through the air inlet opening 12 when the louvers 80 are in a non-deployed state, such that the air inlet opening 12 is exposed to ambient air regardless of a state of deployment of the louvers 80. The actuators 42 are mounted to a support structure 62 and are coupled with the louvers 80 through linkages 64, which may include a multi-bar mechanism with pivots. The louvers 80 are also supported by stationary bars 82 held by the support structure 62. As shown in FIG. 9B, when the louvers 80 are in a deployed or retracted state, passing air (indicated by a horizontal arrow) flowing counter to a forward vehicular travel direction is not deflected by the louvers 80; however, some air is still admitted between the louvers 80 through the air inlet opening 12 (as shown by the vertical arrows). Referring to FIG. 9C, when the louvers 80 are moved by the actuators 42 into a deployed state, a leading edge of each of the louvers 80 is raised into the flow of passing air, to cause at least a portion of the passing air to be deflected (e.g., between the louvers 80) into the air inlet opening 12. Such deflection uses dynamic pressure created by vehicle motion to increase static pressure within the intake apparatus, and increases the flow of air through the air inlet opening 12. As shown in FIGS. 9B-9C, each louver 80 may be curved in a generally concave direction facing the air inlet opening 12 to facilitate a smooth change of direction for air being deflected into the air inlet opening 12 when the louvers 80 are in a deployed state, and each louver 80 may be curved in a generally convex direction facing away from the air inlet opening 12 to reduce aerodynamic drag when the louvers 80 are in an undeployed or retracted state.

Figure 10:
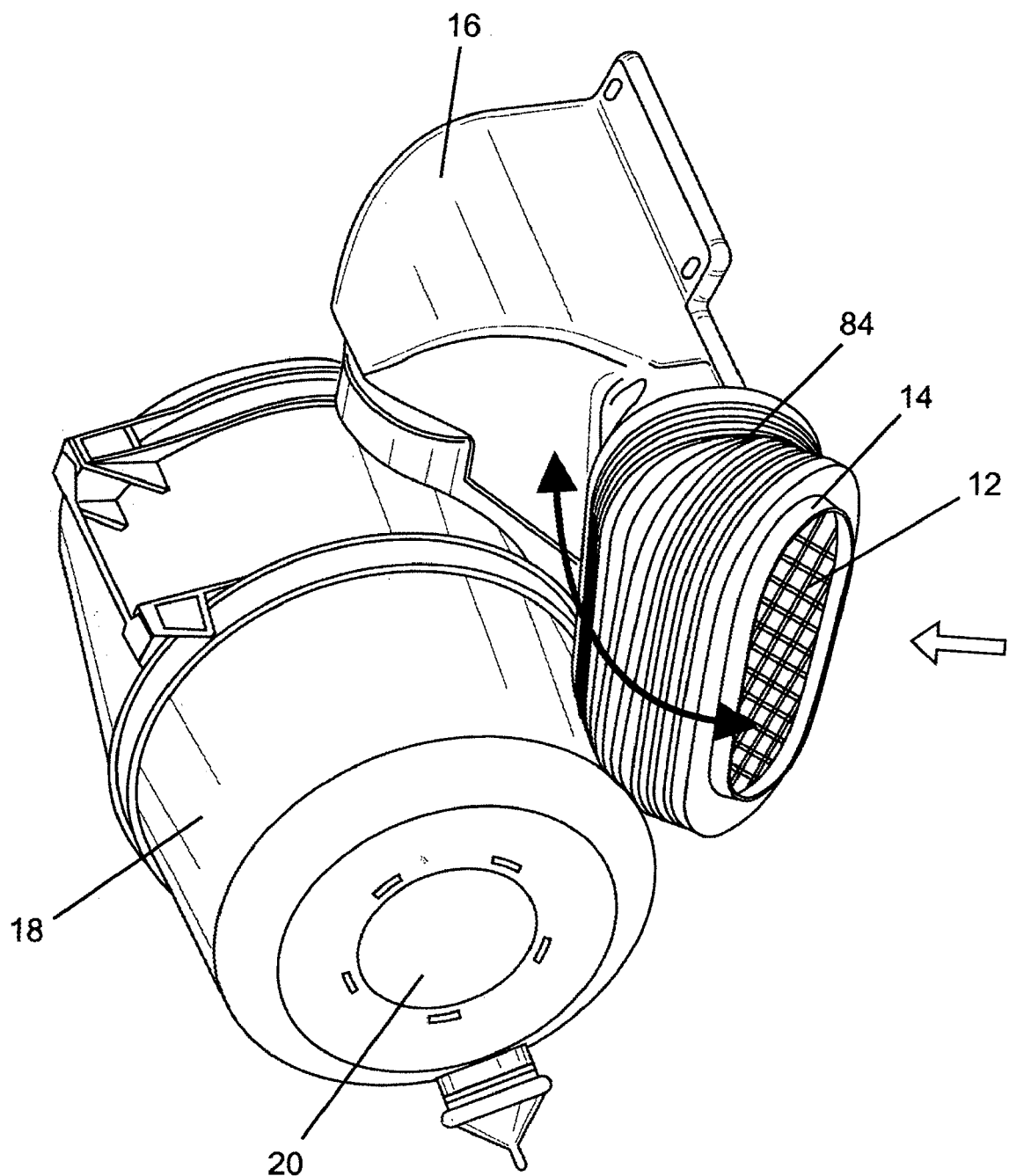
FIG. 10 is a perspective view of components of a combustion air intake system including a selectively deployable deflector element embodying a moveable duct portion according to one embodiment of the present disclosure.

FIG. 10 illustrates components of a combustion air intake system including a selectively deployable deflector element embodying a moveable duct section 84 configured to alter an angular position of an air inlet opening 12 that is defined by a frame 14. The air inlet opening 12 is arranged upstream of a neck 16 and a filter housing 18 having a removable filter housing cap 20. The moveable duct section 84 includes a flexible bellows-type wall structure that permits the air inlet opening 12 to be moved from an undeployed or retracted position (that is preferably substantially parallel to a direction of forward vehicle travel) to a deployed position in which the angular position of the air inlet opening 12 is altered to increase deflection of air into the air intake system. The solid arrow illustrated in FIG. 10 depicts the direction of movement of the moveable duct section 84 between the undeployed and deployed positions, whereas the hollow arrow depicts the movement of passing air, which is generally opposite to a direction of forward travel of a vehicle bearing the air intake system. By causing a trailing edge of the frame 14 to move generally outward and forward when the moveable duct section 84 is in a deployed position, the frontal area of the air inlet opening 12 arranged to "catch" passing air is increased, thereby causing at least a portion of the passing air to be deflected into the air inlet opening 12 and increasing static pressure in the air intake system downstream of the air inlet opening 12.

FIGS. 11A-11B are schematic top plan views of portions of a combustion air intake system including a moveable duct section 84 and an actuator 42 according to one embodiment of the present disclosure. The moveable duct section 84 is configured to alter an angular position of an air inlet opening 12 that is defined by a frame 14. In FIG. 11A, the moveable duct section 84 is in an undeployed or retracted position, with the air inlet opening 12 being substantially parallel to a flow of passing air (represented by the horizontal arrow). FIG. 11B illustrates the moveable duct section 84 in a deployed position, motivated by expansion of the actuator 42 pivotally linked to a support structure 62. When the moveable duct section 84 is deployed, a trailing edge of the frame 14 is moved generally outward and forward to increase the frontal area of the air inlet opening 12 that receives passing air, and to cause the angular position of the air inlet opening 12 to be moved by an angle θ. Such position causes at least a portion of the passing air to be deflected into the air inlet opening 12 and thereby increases static pressure in the air intake system downstream of the air inlet opening 12. In certain embodiments, the angle θ representing the difference in angular position between the air inlet opening 12 in the undeployed and deployed states may be in a range of from 15 to 90 degrees, from 30 to 85 degrees, from 35 to 75 degrees, or from 40 to 60 degrees. In certain embodiments, the air inlet opening 12 may be substantially parallel to a direction of forward travel of the truck, tractor, or bus vehicle when the moveable duct section 84 is in an undeployed position. Preferably, the air inlet opening 12 is exposed to ambient air regardless of a state of deployment of the moveable duct section 84.

In certain embodiments, the air inlet opening of a combustion air intake system disclosed herein may be arranged non-perpendicular to the forward direction of travel of the truck, tractor, or bus vehicle, and may be arranged generally behind or above a passenger cabin of the vehicle.

FIG. 12A is a side elevation view of a front portion of a truck or tractor vehicle 34 including an air inlet opening 12 and a downstream neck 16 located generally behind the passenger cabin 36. Such air inlet opening 12 may be modified to include at least one selectively deployable air deflecting element as disclosed herein. FIG. 12B is a front elevation view of the truck or tractor vehicle 34 of FIG. 12A, showing that no portion of the air inlet opening 12 is visible from the front of the vehicle 34.

FIG. 13A is a side elevation view of a front portion of a truck or tractor vehicle 34 including an air inlet opening 12 located generally above the passenger cabin 36, with a downstream neck 16 located behind the passenger cabin 36. The air inlet opening 12 may be modified to include at least one selectively deployable air deflecting element as disclosed herein. FIG. 13B is a front elevation view of the truck or tractor vehicle 34 of FIG. 13A, showing that ducting associated with the air inlet opening 12 may be visible from the front of the vehicle 34, but the air inlet opening 12 may be substantially parallel to the forward direction of travel of the vehicle such that an opening of the air inlet opening 12 is not visible from the front of the vehicle 34.

In another aspect, the disclosure relates to a method of supplying combustion air to a truck, tractor, or bus vehicle for highway use. The method includes utilizing a controller operatively coupled with at least one actuator to selectively deploy or retract at least one air deflecting element proximate to a frame defining an air inlet opening. The at least one air deflecting element comprises a retracted position and comprises a deployed position in which the at least one air deflecting element is arranged to deflect air into the air inlet opening while the truck, tractor, or bus vehicle is traveling in a forward direction. The selective deployment or retraction of the at least one air deflecting element is responsive to at least one signal indicative of one or more (optionally multiple) sensed parameters. Examples of parameters that may be used include the following parameters: (i) forward speed of the truck, tractor, or bus vehicle; (ii) air pressure downstream of the air inlet opening, or (iii) throttle position of the truck, tractor, or bus vehicle. In certain embodiments, deployment or retraction of the at least one air deflecting element is responsive, or is further responsive, to one or more signals indicative of at least one of the following parameters: (A) presence of precipitation proximate to the truck, tractor, or bus vehicle; or (B) presence of particulate material proximate to the truck, tractor, or bus vehicle. Such a method may use air intake system components disclosed herein.

Embodiments as disclosed herein may provide one or more of the following beneficial technical effects: improving volumetric efficiency of a truck, tractor, or bus vehicle engine (thus enhancing power output and/or improving fuel economy and engine emission characteristics) while avoiding undue ingestion of particulate matter and/or precipitation; reducing aerodynamic drag associated with using scoop-type static ram air systems under conditions when increased static air pressure is not necessary; and ensuring that a constant flow of combustion air is available to a truck, tractor, or bus vehicle engine even in the case of unintended failure of one or more active air intake system elements.

While the invention has been has been described herein in reference to specific aspects, features, and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. A combustion air intake apparatus for a truck, tractor, or bus vehicle for highway use, the combustion air intake apparatus comprising:
    a frame defining an air inlet opening in fluid communication with the combustion air intake apparatus;
    at least one air deflecting element proximate to the frame, wherein the at least one air deflecting element comprises a retracted position and comprises a deployed position in which the at least one air deflecting element is arranged to deflect air into the air inlet opening while the truck, tractor, or bus vehicle is traveling in a forward direction;
    a neck configured to direct air from the air inlet opening to a filter housing containing an air filter of an engine of the truck, tractor, or bus vehicle, wherein the neck is arranged between the at least one air deflecting element and the filter housing; and
    a controller operatively coupled with at least one actuator to selectively deploy or retract the at least one air deflecting element, wherein the controller is configured to control deployment or retraction of the at least one air deflecting element responsive to at least one signal indicative of one or more sensed parameters;
    wherein the air inlet opening is open to admit ambient air into the combustion air intake apparatus and to supply air through the neck to the filter housing and the air filter when the at least one air deflecting element is in the deployed position and when the at least one air deflecting element is in the retracted position; and
    wherein the air inlet opening is arranged generally behind or above a passenger cabin of the truck, tractor, or bus vehicle.

2. The combustion air intake apparatus of claim 1, wherein the controller is configured to control deployment or retraction of the at least one air deflecting element responsive to at least one signal indicative of at least one of the following parameters (i) to (iii): (i) forward speed of the truck, tractor, or bus vehicle, (ii) air pressure downstream of the air inlet opening, or (iii) throttle position of the truck, tractor, or bus vehicle.

3. The combustion air intake apparatus of claim 2, wherein the controller is configured to control deployment or retraction of the at least one air deflecting element responsive to one or more signals indicative of at least two of the parameters (i) to (iii).

4. The combustion air intake apparatus of claim 1, wherein the controller is configured to control deployment or retraction of the at least one air deflecting element responsive to one or more signals indicative of at least one of the following parameters: (A) presence of precipitation proximate to the truck, tractor, or bus vehicle; or (B) presence of particulate material proximate to the truck, tractor, or bus vehicle.

5. The combustion air intake apparatus of claim 1, wherein the air inlet opening is arranged non-perpendicular to the forward direction of travel of the truck, tractor, or bus vehicle.

6. The combustion air intake apparatus of claim 1, wherein the at least one air deflecting element comprises at least one moveable deflector plate or flap arranged proximate to the air inlet opening.

7. The combustion air intake apparatus of claim 6, wherein the at least one moveable deflector plate or flap is arranged generally behind the air inlet opening, relative to the forward direction of travel of the truck, tractor, or bus vehicle, when the at least one moveable deflector plate or flap is in a non-deployed or retracted state.

8. The combustion air intake apparatus of claim 1, wherein the at least one air deflecting element comprises a plurality of louvers arranged proximate to the air inlet opening.

9. The combustion air intake apparatus of claim 1, wherein the at least one air deflecting element comprises a moveable duct portion configured to alter an angular position of the air inlet opening.

10. A method of supplying combustion air to a truck, tractor, or bus vehicle for highway use, the method comprising:
    utilizing a controller operatively coupled with at least one actuator to selectively deploy or retract at least one air deflecting element proximate to a frame defining an air inlet opening, wherein the at least one air deflecting element comprises a retracted position and comprises a deployed position in which the at least one air deflecting element is arranged to deflect air into the air inlet opening while the truck, tractor, or bus vehicle is traveling in a forward direction;

wherein selective deployment or retraction of the at least one air deflecting element is responsive to at least one signal indicative of one or more sensed parameters; and wherein the air inlet opening is open to admit ambient air into a combustion air intake apparatus and to supply air through a neck to a filter housing containing an air filter of an engine of the truck, tractor, or bus vehicle when the at least one air deflecting element is in the deployed position and also when the at least one air deflecting element is in the retracted position;

wherein the neck is arranged between the at least one air deflecting element and the filter housing wherein the air inlet opening is arranged generally behind or above a passenger cabin of the truck, tractor, or bus vehicle.

11. The method of claim 10, wherein said selective deployment or retraction of the at least one air deflecting element is responsive to one or more signals indicative of at least one of the following parameters (i) to (iii): (i) forward speed of the truck, tractor, or bus vehicle; (ii) air pressure downstream of the air inlet opening, or (iii) throttle position of the truck, tractor, or bus vehicle.

12. The method of claim 11, wherein said selective deployment or retraction of the at least one air deflecting element is responsive to one or more signals indicative of at least two of the parameters (i) to (iii).

13. The method of claim 11, further comprising monitoring at least one of the parameters (i) to (iii).

14. The method of claim 10, wherein said deployment or retraction of the at least one air deflecting element is responsive to one or more signals indicative of at least one of the following parameters: (A) presence of precipitation proximate to the truck, tractor, or bus vehicle; or (B) presence of particulate material proximate to the truck, tractor, or bus vehicle.

15. The method of claim 10, wherein the air inlet opening is arranged non-perpendicular to the forward direction of travel of the truck, tractor, or bus vehicle.

16. The method of claim 10, wherein the at least one air deflecting element comprises at least one moveable deflector plate or flap arranged proximate to the air inlet opening.

17. The method of claim 10, wherein the at least one air deflecting element comprises a plurality of louvers arranged proximate to the air inlet opening.

18. The method of claim 10, wherein the at least one air deflecting element comprises a moveable duct portion configured to alter an angular position of the air inlet opening.

* * * * *